(12) United States Patent
Doetsch et al.

(10) Patent No.: US 6,646,579 B2
(45) Date of Patent: Nov. 11, 2003

(54) METHOD AND DEVICE FOR GENERATING OVSF CODE WORDS

(75) Inventors: Markus Doetsch, Schliern (CH); Patrick Feyfant, Golfe Juan (FR); Peter Jung, Otterberg (DE); Tideya Kella, Munich (DE); Joerg Plechinger, Munich (DE); Peter Schmidt, Erpolzheim (DE); Michael Schneider, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/203,067

(22) PCT Filed: Jan. 22, 2001

(86) PCT No.: PCT/EP01/00668
§ 371 (c)(1),
(2), (4) Date: Sep. 23, 2002

(87) PCT Pub. No.: WO01/58070
PCT Pub. Date: Aug. 9, 2001

(65) Prior Publication Data
US 2003/0105532 A1 Jun. 5, 2003

(30) Foreign Application Priority Data
Feb. 4, 2000 (DE) .......................... 100 04 873

(51) Int. Cl.[7] .......................... H04B 7/216; H03M 7/14
(52) U.S. Cl. .......................... 341/96; 370/335; 370/342; 370/441
(58) Field of Search .......................... 341/96; 370/203, 370/208, 209, 335, 342, 441; 375/146, 130, 141; 708/410

(56) References Cited

U.S. PATENT DOCUMENTS

| | | | |
|---|---|---|---|
| 5,751,761 A | 5/1998 | Gilhousen | 375/146 |
| 6,041,034 A | 3/2000 | Fukumasa et al. | 370/203 |
| 6,091,757 A * | 7/2000 | Cudak et al. | 375/130 |
| 6,526,065 B1 * | 2/2003 | Cheng | 370/441 |
| 6,552,996 B2 * | 4/2003 | Kim et al. | 370/209 |

FOREIGN PATENT DOCUMENTS

| | | |
|---|---|---|
| DE | 198 35 643 A1 | 2/2000 |
| EP | 0 814 581 A2 | 6/1997 |
| EP | 0 814 581 A2 | 12/1997 |

\* cited by examiner

Primary Examiner—Patrick Wamsley

(57) ABSTRACT

A code word generator for OVSF codes, comprising an intermediate memory device (16) which is used to input a calculation index as a binary calculation index data word, a calculation device (17) which permutes the significant data bits of the calculation index data word bit-by-bit so that a calculation basis (B) can be generated, a counter (21) for producing a counting variable (Z) and provided with a logic circuit comprising several AND gates for bit-by-bit linkage of the counting variables (Z) generated with the calculation basis (B) in order to form a linking data word and several XOR gates for logical reduction of the linking data word to form code word data bits of the OVSF code word.

17 Claims, 3 Drawing Sheets

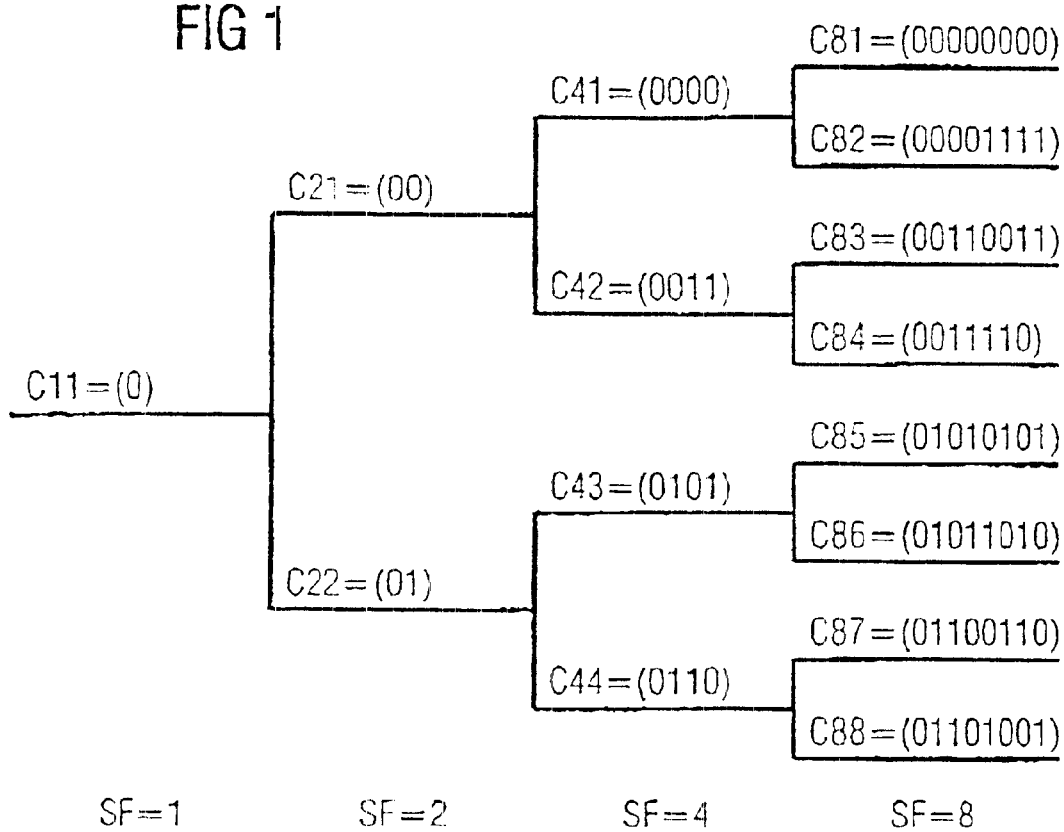
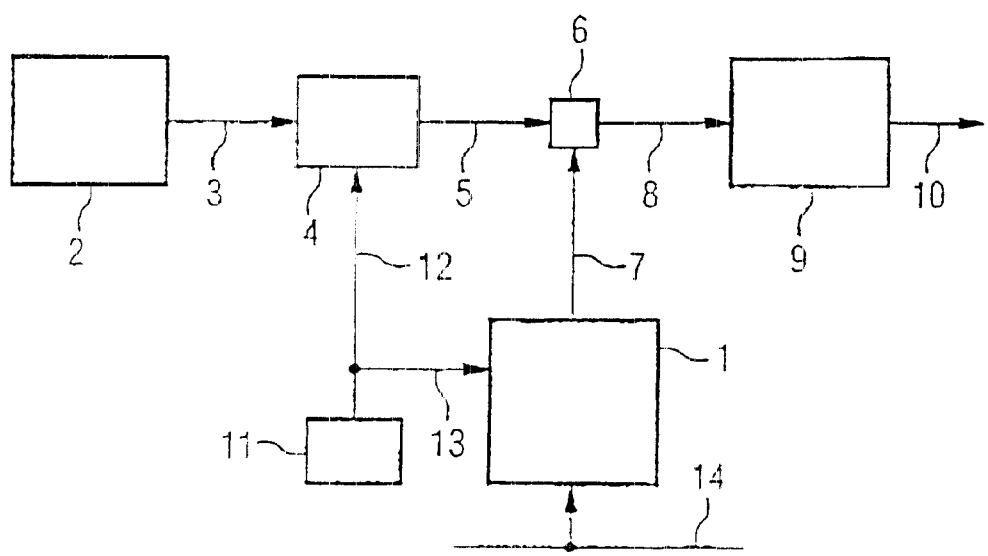

METHOD AND DEVICE FOR GENERATING OVSF CODE WORDS

The invention relates to an apparatus and a method for generating OVSF code words for CDMA methods, particularly in the field of mobile radio technology.

The CDMA method (CDMA: Code Division Multiple Access) is a channel access method, particularly for cellular systems for the mobile radio sector. In this case, a narrowband signal is spread using a code to form a broadband signal. This is done by virtue of a digital data stream which is to be transmitted not being transmitted directly as a succession of the bit values 0 and 1, but rather by virtue of the digital user data values 0 and 1 being represented by a succession of n likewise binary symbols, so-called code chips. CDMA is more immune to interference than TDMA (Time Division Multiple Access) or FDMA (Frequency Division Multiple Access), since it is less susceptible to fading. Furthermore, CDMA makes optimum use of the available frequency spectrum by dispensing with guard bands and guard time. The CDMA method is clearly a method in which a plurality of call parties speak in one space, with two call parties respectively conversing in their own language. This is achieved by using orthogonal codes having a variable spreading factor, so-called OVSF codes. The OVSF codes ensure orthogonality between different transmissions in a physical transmission channel. The OVSF codes make it possible to transmit data simultaneously over a plurality of data channels at different data transmission rates by using different codes having different spreading factors. The spreading factor is the number of code chips per data symbol. The product of the data rate and the spreading factor is constant and corresponds to the chip rate of the system, for example 3.84 MHz for UMTS.

OVSF codes are periodic codes whose period is equal to the duration of the symbol. OVSF codes have been generated to date using the recursive relationship below.

$C_{1,1} = 0$ $$\begin{bmatrix} C_{2,1} \\ c_{2,2} \end{bmatrix} = \begin{bmatrix} C_{1,1} & C_{1,1} \\ C_{1,kl} & C_{1,1} \end{bmatrix} = \begin{bmatrix} 0 & 0 \\ 0 & 1 \end{bmatrix}$$

$$\begin{bmatrix} C_{4,1} \\ C_{4,2} \\ C_{4,3} \\ C_{4,4} \end{bmatrix} = \begin{bmatrix} C_{2,1} & C_{2,1} \\ C_{2,1} & \overline{C_{2,1}} \\ C_{2,2} & C_{2,2} \\ C_{2,2} & \overline{C_{2,2}} \end{bmatrix} = \begin{bmatrix} 0 & 0 & 0 & 0 \\ 0 & 0 & 1 & 1 \\ 0 & 1 & 0 & 1 \\ 0 & 1 & 1 & 0 \end{bmatrix}$$

$$\begin{bmatrix} C_{2^{n+1},1} \\ C_{2^{n+1},2} \\ C_{2^{n+1},3} \\ C_{2^{n+1},4} \\ \vdots \\ C_{2^{n+1},2^{n+1}-1} \\ C_{2^{n+1},2^{n+1}} \end{bmatrix} = \begin{bmatrix} C_{2^n,1} & C_{2^n,1} \\ C_{2^n,1} & \overline{C_{2^n,1}} \\ C_{2^n,2} & C_{2^n,2} \\ C_{2^n,2} & \overline{C_{2^n,2}} \\ \vdots & \vdots \\ C_{2^n,2^n} & C_{2^n,2^n} \\ C_{2^n,2^n} & \overline{C_{2^n,2^n}} \end{bmatrix}$$

OVSF codes are shown most clearly in a code tree structure.

FIG. 1 shows an example of an OVSF code tree whose spreading factor ranges from 1 to 8. The code allocation rule for OVSF codes, which ensures the orthogonality between the physical data transmission channels, is that, if a branch of the code tree is used for coding, all the preceding and succeeding branches in the tree structure are not permitted for further coding. If, by way of example, the code $C_{4,1}$ in the OVSF code tree shown in FIG. 1 is allocated for coding a channel, then the codes $C_{2,1}$, $C_{1,1}$, $C_{8,1}$ and $C_{8,2}$ are blocked until the allocated code $C_{4,1}$ has been released again.

The previously known methods for generating OVSF codes generate the OVSF code word using the above recursive description. This recursive calculation convention requires a high level of computational complexity and a large number of computational operations, however. Such OVSF code word generators based on the prior art are therefore very complex in terms of circuitry and require a large amount of storage space.

It is therefore the object of the present invention to provide an apparatus and a method for generating OVSF code words in which the OVSF code word is generated with very little complexity in terms of circuitry.

The invention achieves this object by means of a method having [lacuna] features specified in patent claim 1 and by means of an apparatus having the features specified in patent claim 6.

The invention provides a method for generating an OVSF code word from code tree index data associated with a particular OVSF code within a prescribed OVSF tree, where a first code tree index data item (i) indicates the spreading factor of the OVSF code, and a second code tree index data item (j) indicates the position of the OVSF code among OVSF codes having the same spreading factor within the OVSF code tree, the method having the following steps:

a calculation index is calculated on the basis of the second code tree index data item (j), the calculated calculation index is buffered as a binary data word having a plurality of data bits, the word length of the binary data word is calculated; the data bits of the data word are interchanged bit by bit in order to form a calculation base, the calculation base is logically combined with a counting variable in order to form a logically combined data word, and the logically combined data word is logically reduced in order to generate the OVSF code word.

The calculation index is preferably calculated by subtracting 1 from the second code tree index data item (j).

In one preferred development, the calculation base is logically ANDed with the counting variable bit by bit.

In one preferred development, the logically combined data word is logically reduced by means of multistage XORing of adjacent data bits.

In one preferred embodiment of the inventive method, the counting variable is generated by a modulo counter whose modulo base corresponds to the spreading factor of the OVSF code word which is to be generated.

The invention also provides a code word generator for OVSF codes, having a buffer device for writing in a calculation index as a binary calculation index data word, a calculation device which interchanges the data bits of the calculation index data word bit by bit in order to generate a calculation base, a counter for generating a counting variable, and having a logic circuit which has a plurality of AND gates for logically ANDing the generated counting variable with the calculation base bit by bit to form a logically combined data word, and a plurality of XOR gates for logically reducing the logically combined data word formed in order to form code word chips of the OVSF code word.

The code word generator preferably has an input buffer for reading in a first code tree index data item index data item [sic] (i) and a second code tree index data item (j), the first code tree index data item (i) indicating the spreading factor of the OVSF code, and the second code tree index data item (j) indicating the position of the OVSF code among the OVSF codes having the same spreading factor within the OVSF code tree.

Preferably, a subtraction device is provided which reduces the second code tree index data item (j) by 1 in order to calculate the calculation index.

In one preferred development, the counter is a modulo counter whose modulo counting base is adjustable.

In one preferred development, the modulo counting base corresponds to the spreading factor of the OVSF code word which is to be generated.

In another preferred development, a calculation unit is provided which is used for calculating the data word length of the calculation index data word.

In another preferred development, the calculated data word length of the calculation index data word is stored in a buffer.

In another preferred embodiment of the inventive code word generator, an output buffer is provided which buffers the code word data bits generated by the logic circuit in order to form the OVSF code word.

The counter is preferably clocked at the code chip frequency.

The text below describes preferred embodiments of the inventive method and of the inventive code word generator for OVSF codes in accordance with the invention with reference to the appended figures to illustrate inventive features.

In the figures:

FIG. 1 shows the structure of an OVSF code tree;

FIG. 2 shows a block diagram of a CDMA transmission device for which the inventive code word generator for OVSF codes is used;

Figure 3:
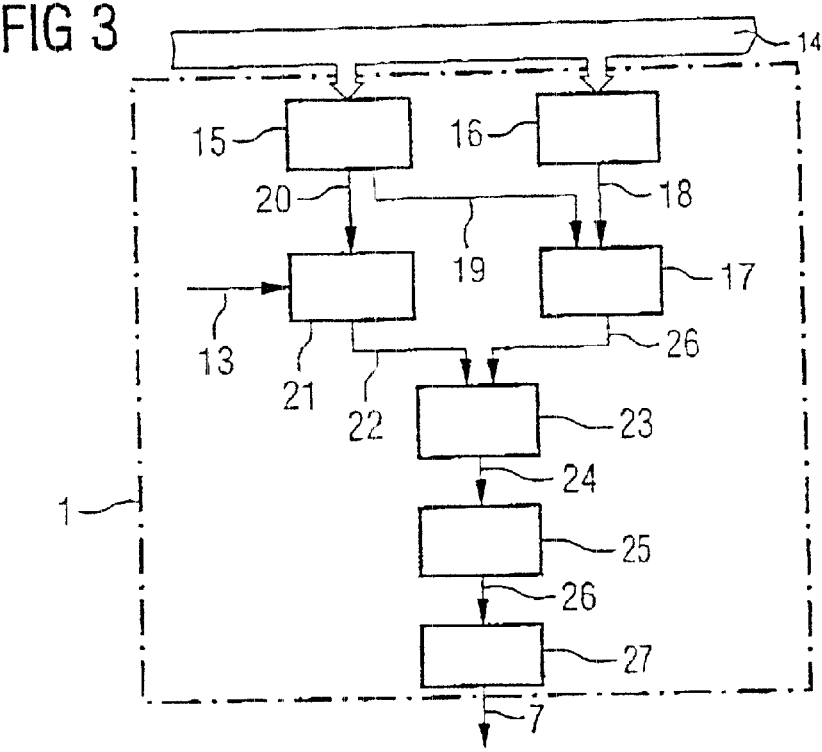
FIG. 3 shows a preferred embodiment of the inventive code word generator for OVSF codes.

As can be seen from FIG. 2, the inventive code word generator 1 for OVSF codes forms part of a CDMA transmission device. A data source 2 in the CDMA transmission device generates data symbols which are supplied to a spreading circuit 4 via a line 3. In this case, the spreading circuit 4 is used for oversampling each data bit at an oversampling rate which corresponds to the spreading factor. In the embodiment shown in FIG. 2, the spread data are supplied via a line 5 to a multiplication device 6, where the spread data are multiplied by the generated OVSF code word which is on the line 7. The oversampled data bits and the generated OVSF code word bits with the value range {0,1} are converted or mapped to the antipodal value range {−1,+1} before multiplication.

In one alternative embodiment, the oversampled data bits and the generated OVSF code word bits are first logically combined with one another by a logic circuit and are then mapped or converted to the antipodal value range {−1;+1}. The logic circuit is preferably an EXOR logic circuit or an equivalent logic circuit.

The coded transmission signal formed in this manner is output by the multiplication device 6 to a signal conditioning circuit 9 via a line 8. The signal conditioning circuit 9 conditions the coded transmission signal for transmission via the transmission channel. The conditioned transmission signal is output by the signal conditioning circuit 9 via the line 10 for further transmission.

A clock generator 11 supplies a chip clock signal to the spreading circuit 4 and to the code word generator 1 via lines 12, 13. The code word generator 1 is connected to a signal bus 14 for data interchange with a DSP (Digital Signal Processor) or with a microcontroller.

FIG. 3 shows a preferred embodiment of the inventive code word generator 1. The code word generator 1 comprises two input registers 15, 16 via which data are read in from the bus 14. The input register 16 is used for buffering a calculation index as a binary calculation index data word. The input register 15 is used to store the data word length N of the calculation index data word buffered in the register 16. The code word generator 1 also contains a calculation device 17 which interchanges the data bits of the calculation index data word buffered in the register 16 bit by bit in order to generate a calculation base. To this end, the calculation device 17 reads in, via data lines 18, the calculation index data word stored in the storage register 16, with the calculation device 17 receiving, via lines 19, a control signal which indicates the data word length of the calculation index data word. Control lines 20 are used to set the modulo counting base N of a modulo counter 21 according to the data word length of the binary calculation index data word. The modulo counter 21 is supplied with the clock signal via the clock line 13. The output of the modulo counter 21 is connected via data lines 22 to a logic circuit which comprises a plurality of AND gates 23 and also XOR gates 25 connected downstream via lines 24. The AND gates 23 logically combine the output data bit lines 22 of the modulo counter 21 with data bit output lines 26 of the calculation device 17 bit by bit. The output data lines 26 carry the calculation base generated in the calculation device 17. The AND gates 23 logically combine the counting variable which is on the output lines 22 with the calculation base which is on the lines 26 bit by bit to form a logically combined data word, which is logically reduced by the XOR gates 25 in order to form a code word data bit of the OVSF code word. The code word data bits generated bit by bit are stored via lines 26 in an output buffer 27 which outputs the generated OVSF code word to the multiplication device 6 via the line 7.

The way in which the code word generator for OVSF codes shown in FIG. 3 works is explained below with reference to the code tree shown in FIG. 1.

A code allocation algorithm first ascertains the OVSF code to be formed within the code tree structure. By way of example, the OVSF code $C_{4,3}$ needs to be generated by the code generator 1. The selected OVSF code is stipulated by its two code tree index data items i, j.

In this case, the first code tree index data item i corresponds to the spreading factor of the OVSF code, for example 4, and the second code tree index data item j indicates the position of the OVSF code within those OVSF codes which have the same spreading factor within the OVSF code tree. For a spreading factor of 4, there are four different OVSF codes; by way of example, the third OVSF code having a spreading factor of 4 is $C_{4,3}$=0101. From the second code tree index data item j, a calculation index is ascertained for further calculation. In the case of the indexing chosen in FIG. 1, this is preferably done by subtracting 1 from the second code tree index data item j. The calculation index calculated in this manner is written to the input register 16 of the code word generator 1 via the bus 14. The data word length of the calculation index N is calculated by forming the base two logarithm of the first code tree index data item i. If the OVSF code to be formed is $C_{4,3}$ and if the first code tree index data item i is thus 4 in line with the spreading factor, and if the second code tree index data item j is equal to 3 in line with the position of the OVSF code, the calculated calculation index is 2. The binary data length N of the calculated calculation index is likewise 2 and is written to the register 15 as a calculation index data word length N. The calculation device 17 for generating a calculation phase requires the data word length of the binary calculation index stored in the register 16 in order to interchange the data bits of the calculation index deliberately step by step.

Calculation index 0000000 10
Calculation base 0000000 01
Calculation index 00000 . . . $A_{n-1} A_{n-2} \ldots A_1 A_0$
Calculation base 00000 . . . $A_0 A_1 \ldots A_{n-2} A_{n-1}$ The data bits of the calculation index data word, whose word length N is 2 in the example shown, are allocated bit by bit in decimal notation as follows:

$$\sum_{i=0}^{N-1} A_i 2^i \rightarrow \sum_{i=0}^{N-1} A_i 2^{N-1-i}$$

The calculation base generated by the calculation device 17 is logically ANDed bit by bit with the counting variable formed by the modulo counter 21, using a plurality of AND gates. The base for the modulo counter is adjustable and corresponds to the spreading factor.

The AND gates 23 form a binary logically combined data word which is supplied to a logic reduction circuit 25 via signal lines 24.

Figure 4:
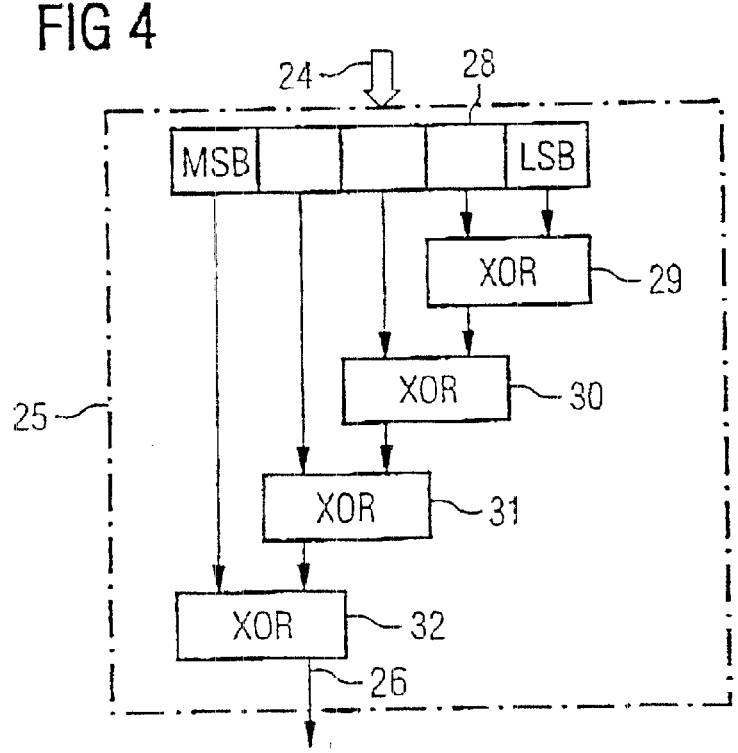
FIG. 4 shows a logic reduction circuit forming part of the inventive code word generator for OVSF codes.

FIG. 4 shows an exemplary embodiment of a logic reduction circuit 25 in the inventive code word generator 1 for a data word length N=5. The data bits of the logically combined data word, which are buffered in a register 28, for example, are logically XORed in pairs starting with the least significant bit LSB using XOR gates 29, 30, 31, 32 in order to form a code word data bit of the OVSF code word. The code word data bit formed by the logic reduction is passed via the line 26 to an output memory, in which the code word data bits formed are compiled to form the OVSF code word. The paired logical combination of the adjacent data bits of the logically combined data word formed by the logic AND circuit can also start with the most significant bit MSB.

To illustrate further, the formation of an OVSF code word by the inventive code word generator is shown using an example. If the allocation algorithm indicates the formation of the OVSF code $C_{4,3}$ with the first code word index data item 4 and the second code word index data item 3, the calculation index and the word length N of the calculation index are first calculated.

$C_{43}=0101$ i=4
j=3
Calculation index=j−1=2
Word length N=ldi=ld4=2

The calculation device 17 uses bit-by-bit interchange of the data bits of the calculation index data word to calculate the calculation base as 01. The modulo counting base for the modulo counter 21 is set to the word length N, and the counter is initialized to the initial count values 00.

Calculation base=01
Counter:=00

Logic ANDing of the counter value and the calculation base calculates a logically combined data word Tmp=00.

Logic reduction using XOR gates calculates the first code word chip bit $Code_1$ of the OVSF code word from this logically combined data word.

Tmp=00 & 01=00
$Code_1$=0 XOR 0=0

Next, the counter is incremented and a new logically combined data word Tmp is calculated by logic ANDing of the counter with the calculation base. Logic reduction of the logically combined data word calculates the next code word chip bit $Code_2$ of the OVSF code word and writes it to the output register 27.

Counter:=01
Tmp=01 & 01=01
$Code_2$=0 XOR1=1

The counter is then incremented again, the logically combined data word Tmp is formed and the third code word data bit of the OVSF code word is generated by logic XORing.

Counter:=10
Tmp=10 & 01=00
$Code_3$=0 XOR 0=0

Finally, the counter is incremented again, the logically combined data word Tmp is formed and the last code word chip bit $Code_4$ of the OVSF code word is generated.

Counter:=11
Tmp=11 & 01=01
$Code_4$=0 XOR 1=1

The OVSF code word which is generated in this manner by the inventive code word generator 1 and is formed from the four generated code word chip bits ($Code_1$–$Code_4$) corresponds to the code word prescribed by the code tree shown in FIG. 1.

Code word $C_{43}$=0101

The inventive code word generator 1 shown in FIG. 3 is very simple to implement in terms of circuitry, since it comprises merely registers 15, 16, a modulo counter 21, a plurality of AND gates, a plurality of XOR gates and the calculation device 17. The calculation device 17 can easily be implemented using shift registers and simple control logic.

Figure 5:
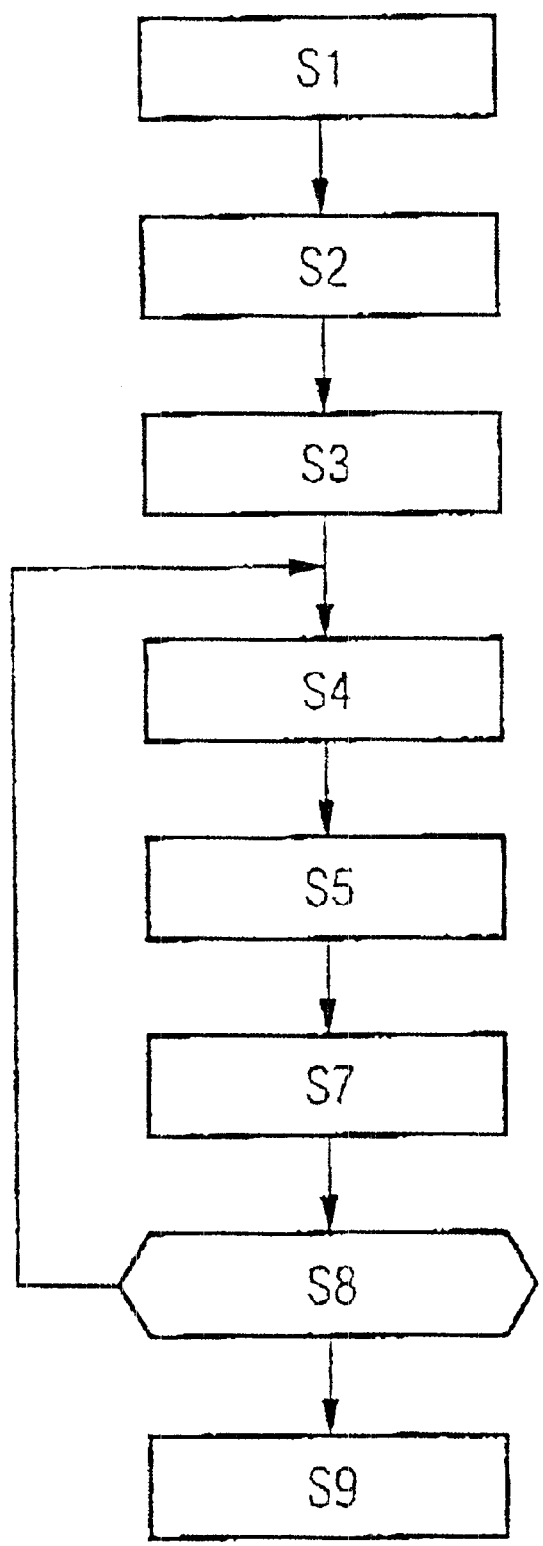
FIG. 5 shows a flowchart to explain the inventive method for generating OVSF code words.

FIG. 5 shows a flowchart for the inventive method for generating an OVSF code word. In a step S1, the code tree index data items i, j for the desired OVSF codes are read in. In this case, the first code tree index data item i corresponds to the spreading factor of the OVSF code, and the second code word index data item j corresponds to the position of the position [sic] of the OVSF code.

Following read-in, a plurality of calculations are performed in step S2. A calculation index is calculated from the second code tree index data item j of the OVSF code by subtraction.

Calculation index=j−1

The data word length N of the calculation index is likewise calculated in step S2.

$N=ld(i)$ where i=1, 2, 4, 8, . . . SFmax

By interchanging the data bits of the calculation index data word bit by bit, the calculation base B is also ascertained in step S2.

B=bit reverse (calculation index, N)

In this case, the N significant bits of the calculation index are interchanged or swapped.

Once the calculation base has been ascertained in this manner in step S2, the modulo base for the modulo counter 21 is set in step, S3 in line with the spreading factor SF of the OVSF code word which is to be generated, and the modulo counter is initialized to the initial count value 0.

In step S4, the calculation base B formed by the calculation device 17 is logically combined and [sic] with the count value of the modulo counter 21. In this case, the logical combination is performed bit by bit by a plurality of logic AND gates. The logic ANDing forms a logically combined data word which is logically reduced in step S5 by a plurality of XOR gates 25 in order to form a code word data bit of the OVSF code word.

In step S6, the code word data bit formed is written to the output memory 27, and the modulo counter 21 is incremented.

In step S8, a check is performed to determine whether the modulo counter has reached the initial initialization value 0 again and hence the loop has been performed sufficiently often in line with the spreading factor SF of the OVSF code word.

In step S9, the OVSF code word compiled in the output memory 27 from the code word data bits formed is read out and is output to the multiplication device 6 via the line 7 shown in FIG. 2.

In one alternative embodiment, the inventive code word generator for OVSF codes can be simplified further in terms of circuitry by virtue of the computational operations performed by the calculation device 17 being performed by the DSP processor connected to the bus 14.

The inventive method and the inventive generator for generating an OVSF code word can generate the associated OVSF code word from the code tree index data items i, j quickly and reliably without complex circuitry.

Such simple implementation in terms of circuitry is advantageous particularly with high spreading factors, for example SF=512.

This allows a significant contribution to be made to miniaturizing a mobile telecommunications terminal which uses the CDMA method.

List of Reference Numerals

1 OVSF code generator
2 Data source
3 Line
4 Spreading circuit
5 Line
6 Multiplication device
7 Lines
8 Lines
9 Signal conditioning
10 Output lines
11 Clock generator
12, 13 Clock lines
14 Bus
15 Register
16 Register
17 Calculation device
18 Lines
19 Lines
20 Lines
21 Modulo counter
22 Lines
23 AND logic circuit
24 Lines
25 XOR logic circuit
26 Lines
27 Output register
28 Buffer
29, 30, 31, 32 XOR gates

What is claimed is:

1. Method for generating an OVSF code word from code tree index data (i, j) associated with a particular OVSF code within an OVSF code tree,
where a first code tree index data item (i) indicates the spreading factor SF of the OVSF code, and a second code tree index data item (j) indicates the position of the OVSF code among the OVSF codes having the same spreading factor SF within the OVSF code tree, the method having the following steps:
   a) a calculation index is calculated on the basis of the second code tree index data item (j);
   b) the calculated calculation index is buffered as a binary data word having a plurality of data bits;
   c) the data word length N of the calculation index data word is calculated;
   d) the significant data bits of the calculation index data word are interchanged bit by bit in order to form a calculation base B;
   e) the calculation base B is logically combined with a counting variable Z in order to form a logically combined data word;
   f) the logically combined data word is logically reduced in order to generate the OVSF code word.

2. Method according to claim 1, characterized in that the calculation index is calculated by subtracting 1 from the second code word index data item (j).

3. Method according to claim 2, characterized in that the calculation base B is logically ANDed with the counting variable Z bit by bit.

4. Code word generator according to claim 1, characterized in that the code word chips generated are logically combined in a logic circuit with oversampled data bits which are output by a spreading circuit.

5. Code word generator according to claim 4, characterized in that the oversampling of the data bits in the spreading circuit and the generation of the code word chips take place synchronously at a chip clock rate generated by a clock generator.

6. Method according to claim 1, characterized in that the logically combined data word is logically reduced by means of multistage XORing of adjacent data bits.

7. Method according to claim 1, characterized in that the counting variable Z is generated by a modulo counter whose modulo base corresponds to the spreading factor SF of the OVSF code word which is to be generated.

8. Code word generator according to claim 1, characterized in that the counter is a modulo counter whose modulo counting base is adjustable.

9. Code word generator according to claim 1, characterized in that the modulo counting base corresponds to the spreading factor SF of the OVSF code word which is to be generated.

10. Code word generator according to claim 1, characterized by a calculation unit for calculating the data word length N of the calculation index data word.

11. Code word generator according to claim 1, characterized by a buffer storing the data word length N of the calculation index data word.

12. Code word generator according to claim 1, characterized by an output memory storing the code word chips generated by the logic circuit to form the OVSF code word.

13. Code word generator according to claim 1, characterized in that the code word chips generated are multiplied in a multiplication device by oversampled data bits which are output by a spreading circuit.

14. Code word generator according to claim 1, characterized in that the modulo counter is clocked at the code chip frequency.

15. Code word generator for OVSF codes, having:

a buffer device for writing in a calculation index as a binary calculation index data word;

a calculation device which interchanges the significant data bits of the calculation index data word bit by bit in order to generate a calculation base B;

a counter for generating a counting variable Z;

and having a logic circuit which has a plurality of AND gates for ANDing the generated counting variable Z with the calculation base B bit by bit to form a logically combined data word, and a plurality of XOR gates for logically reducing the logically combined data word formed in order to form code word chip bits of the OVSF code word.

16. Code word generator according to claim 15, characterized by an input buffer for reading in a first code tree index data item (i) and a second code tree index data item (j), the first code tree index data item (i) indicating the spreading factor SF of the OVSF code, and the second code tree index data item (j) indicating the position of the OVSF code among the OVSF codes having the same spreading factor SF within the OVSF code tree.

17. Code word generator according to claim 16, characterized by a subtraction device which reduces the second code tree index data item (j) by 1 in order to calculate the calculation index.

* * * * *